United States Patent
Alexander et al.

[19]

[11] Patent Number: 6,163,539
[45] Date of Patent: Dec. 19, 2000

[54] FIRMWARE CONTROLLED TRANSMIT DATAPATH FOR HIGH-SPEED PACKET SWITCHES

[75] Inventors: Thomas Alexander, Mulino; Bradley H. Smith, Saint Helens; Alexander D. Rekow, Portland, all of Oreg.

[73] Assignee: PMC-Sierra Ltd., Burnaby, Canada

[21] Appl. No.: 09/066,858

[22] Filed: Apr. 28, 1998

[51] Int. Cl.⁷ .................................................. H04L 12/56
[52] U.S. Cl. ......................... 370/392; 370/395; 370/389
[58] Field of Search .................................. 370/412, 389, 370/395, 399, 428, 429, 413, 415, 392, 400, 401

[56] References Cited

U.S. PATENT DOCUMENTS

| | | | |
|---|---|---|---|
| 5,557,610 | 9/1996 | Calamvokis et al. | 370/398 |
| 5,799,014 | 8/1998 | Kozaki et al. | 370/358 |
| 5,872,783 | 2/1999 | Chin | 370/392 |
| 5,898,687 | 4/1999 | Harriman et al. | 370/390 |
| 5,903,560 | 4/1999 | Samejim et al. | 370/378 |
| 6,009,078 | 12/1999 | Sato | 370/232 |

*Primary Examiner*—Douglas W. Olms
*Assistant Examiner*—Ken Vanderpuye
*Attorney, Agent, or Firm*—Hall, Priddy, Myers & Vande Sande

[57] ABSTRACT

A datapath packet transmission controller which includes a central processing unit (CPU), a transmit FIFO buffer operative to receive and temporarily store data packets, and a disposition FIFO buffer coupled to said CPU for holding packet disposition commands received from said CPU. The CPU controls reception and storage of data packets in the transmit FIFO buffer, accesses data in data packets in the transmit FIFO buffer, provides disposition commands which control the disposition of packets after storage in the transmit FIFO buffer.

15 Claims, 2 Drawing Sheets

FIRMWARE CONTROLLED TRANSMIT DATAPATH FOR HIGH-SPEED PACKET SWITCHES

FIELD

The present invention relates to a packet transmission datapath that incorporates mixed hardware and firmware for a fast Ethernet packet switch.

BACKGROUND

The transmission of Ethernet frames is a relatively complex process, due primarily to the need to implement the Ethernet Medium Access Control functions specified by the IEEE 802.3 standards for Carrier Sense Multiple Access networks. The functions that must be performed during transmission include activity sensing and deference, collision detection and retransmission of frames corrupted by Collisions, flow control, error detection and recovery, and statistics maintenance.

High-speed Ethernet packet switches normally use a purely hardware-based approach to controlling the transmission of frames at the transmit ports of the switching System. This is required because of the high frame rates involved. For example, typical Fast Ethernet packet switches, operating at data rates of too megabits/sec per port, need to process on the order of 150,000 frames per second to support transmission of Ethernet frames at full speed. This implies that a frame transmission needs to be initiated once ever 6.7 microseconds; such rapid frame processing is beyond the capabilities of normal software architectures running on standard low-cost embedded CPUs today. As a result, these packet switches use dedicated, hard-wired logic to handle transmitted frames.

The pure-hardware implementation of the transmit process has several disadvantages. For example, the implementation is far less flexible, as all of the functions must be encoded into hardware; thus it is not possible for the process to be easily modified to take into account future enhancements in areas such as flow control, etc. A hardware implementation may be less cost-effective, as a good deal of the functionality is rarely used, but nevertheless consumes valuable hardware resources. An example of this is the processing required to deal with excessive collisions while transmitting Ethernet packets; the processing is relatively complex, but an excessive collision condition occurs very rarely in properly functioning Ethernet networks. Finally, the expense and inflexibility of the hardware-only implementation is multiplied when the packet switch has to deal with frames that require special processing (for example, signaling frames used by higher-level protocols that must be transmitted in the normal fashion as well as copied to internal packet buffers for use by the switch management entity); the recognition and special handling of such frames requires a good deal of resources when implemented solely in hardware.

Thus, the high packet transmission rates of modern packet switches virtually mandate the need for dedicated hardware to perform the various complex functions required in the transmit path of Ethernet switching equipment. When these functions are implemented in pure hardware, however, the advantages of software (namely, flexibility and low cost coupled with the ability to realize very complex processing) are lost. The resulting implementation is expensive, difficult to extend and modify, and complex to design.

The object of the invention is to obviate the disadvantages of a hardware-only implementation of a transmit datapath for a Fast Ethernet packet switch by using a combination of hardware and firmware (i.e., a embedded CPU). It is a further object of the invention to introduce a firmware function at the appropriate point in the packet transfer path to allow the complex and infrequent functions to be implemented in firmware for flexibility and low cost, while performing the simple and repetitive functions in hardware for speed.

SUMMARY OF THE INVENTION

The primary technical basis for this invention is the observation that the functions performed while transmitting an Ethernet packet can be easily broken up into two types: data handling and decision making. Data handling functions typically include the computation of CRC (Cyclic Redundancy Check) values over transmitted data, FIFO buffering and transfer, parallel-to-serial conversion, and collision detection during transmit. Bit-level timing functions also fall into the data handling category. Decision making functions include frame disposition processing (transmitted, discarded or copied to internal buffers), collision retransmission and excessive collision discard decisions, flow control processing, and the like.

Data handling functions lend themselves well to hardware implementation, as they are usually simple, repetitive, and must be performed on a bit-level or word-level basis (i.e., the units of processing constitute individual bits and words from The Ethernet frame). An example is the frame CRC checkword, which must be computed as a running remainder over every bit in the frame.

Decision making functions are best done in firmware, as they are performed on a frame-by-frame basis rather than a bit-by-bit basis, and The processing to be performed is quite complex. Thus The decision as to whether a given frame should be retransmitted or dropped after a collision needs to be performed only once per frame time, but the processing sequence is involved and would result in a substantial amount of hardware.

This division of functionality between hardware and firmware thus results in a relatively low-cost implementation coupled with a relatively high-performance transmit datapath (though a hardwareonly implementation could offer somewhat better performance>. The resulting datapath, however, is far more flexible than a pure hardware version.

According to the invention there is provided a datapath packet transmission controller which includes a central processing unit (CPU), a transmit FIFO buffer operative to receive and temporarily store data packets, and a disposition FIFO buffer coupled to the CPU for holding packet disposition commands received from the CPU. The CPU controls reception and storage of data packets in the transmit FIFO buffer, accesses data in data packets in the transmit FIFO buffer, provides disposition commands which control the disposition of packets after storage in the transmit FIFO buffer.

The controller may include a FIFO read control coupled to the transmit FIFO buffer operative to control the reading of packet data from the transmit FIFO buffer and a disposition FIFO buffer coupled to the CPU and to the FIFO read control operative to receive and hold packet disposition commands received from the CPU and to transmit them to the FIFO read control after a corresponding data packet has completed being written into the transmit FIFO buffer.

The controller may include a packet interface coupled to a source of data packets, a header extract logic circuit coupled to the packet interface and operative to strip a header from each data packet and to pass the remainder of the data packet to the transmit FIFO buffer.

The controller may further include a communication logic circuit coupled to the packet interface and to the CPU operative to receive signals from a source of the data packets and to pass these signals to the CPU.

The packet interface may be coupled to a source of data packets, and to a header extraction logic circuit coupled to an output of the packet interface. The header extraction logic circuit may be operative to strip off header information from each packet and transfer this information to the CPU. A transmit FIFO buffer may be coupled to the header extraction circuit and function to receive packet data and act as a temporary storage for the packet data same. A FIFO read control may be coupled to the transmit FIFO buffer and be operative to control the reading of packet data from the transmit FIFO buffer. A disposition FIFO buffer may be coupled to the FIFO read control and be operative to receive and hold packet disposition commands corresponding to packets in the transmit FIFO buffer and to transmit each command to the FIFO read buffer upon completion of writing of a corresponding packet into the transmit FIFO buffer. A central processing unit (CPU) coupled to the data packet interface, the header extraction logic, the transmit FIFO buffer, the FIFO read control and the disposition FIFO buffer and containing firmware operative to control data packet reception, processing, and disposition. The CPU may access data in data packets in the transmit FIFO buffer, provide disposition commands to the disposition FIFO buffer and receive packet transmit completion notification from the FIFO read control.

A communications logic circuit may be operative to receive signals from a source of data packets indicating when a packet is ready for transmission and wherein the CPU is coupled to the packet interface through the communications logic circuit.

The CPU has firmware which performs data packet classification and disposition tasks on each data packet that is received by the transmit FIFO buffer, the firmware running concurrently with and independently of the transfer of frame data from the source.

Data packet classification may be performed on a header prepended to the packet data written into the transmit FIFO buffer for each data packet. by the header extraction logic circuit on the basis of data supplied by the source.

The disposition FIFO buffer holds information pertaining to the disposal of data packets that are buffered in the transmit FIFO buffer, with a one-to-one correspondence between entries in the disposition FIFO buffer and the transmit FIFO buffer,

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION WITH REFERENCE TO THE DRAWINGS

Figure 1:
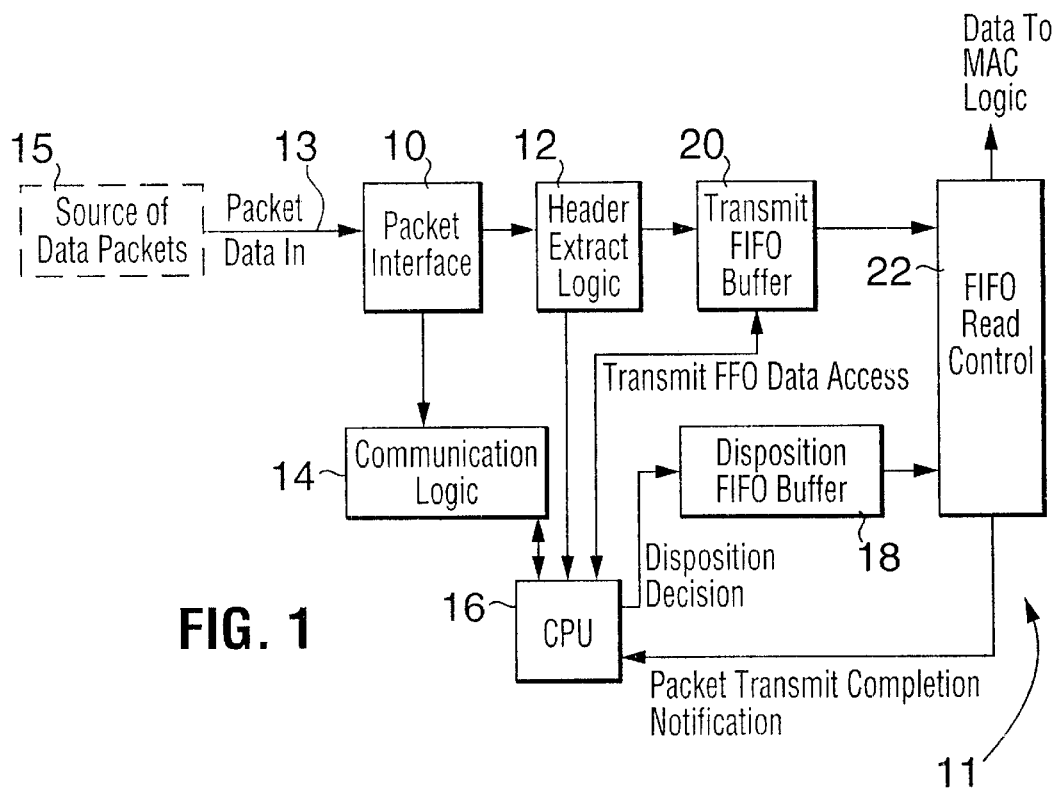
FIG. 1 is a schematic diagram of the datapath transmission control system.

A block diagram of the packet transmission datapath that incorporates the mixed hardware/firmware approach referred to above is shown in FIG. 1. As can be seen from the FIG. 1, the hardware elements constituting the datapath 11 include a packet Interface block 10 that interfaces to a source of packets (not shown) arriving on packet data Input line 13 that must be transmitted by the datapath 11. Communication logic 14 coupled to the packet interface 10 is used by the source of packets to signal that one or more packets are ready for transmission. Header extraction logic 12 is coupled to an output of the packet interface block 10 and intercepts packet data being processed by the datapath 11 and extracts a block of information, referred to as a header, that should be placed at the beginning of the packet data by the source of the packet. This header contains information that is required to make the packet transmission decisions. The header extraction logic 12 removes the header from the packet data and passes the remainder of the packet to a transmit FIFO buffer 20 coupled to an output of the header extraction logic 12.

The transmit FIFO buffer 20, buffers one or more complete packets prior to beginning transmission. The primary function of the transmit FIFO buffer 20 is to prevent any random delays that may be encountered while transferring packet data from the source of the packets, from affecting the operation of the remainder of the datapath. A secondary function is to buffer packet data and allow this data to be accessed by firmware routines.

A disposition FIFO buffer 18 holds packet disposition commands generated by firmware during packet processing which relate to the packets present in the transmit FIFO buffer 20. These disposition commands instruct the downstream logic to either transmit, discard, or hold the packet data. Each disposition command present in the disposition FIFO buffer 18 relates to one and only one packet present in the transmit FIFO buffer 20. If no packets are present in the transmit FIFO buffer 20, then the disposition FIFO buffer 18 must be empty.

FIFO read control logic 22 is coupled to an output of both the transmit FIFO buffer 20 and an output of the disposition FIFO buffer 18. FIFO read control logic 22 is used to read out buffered packet data from the transmit FIFO buffer 20 when it is necessary to supply packet information to a medium access control (MAC) interface (not shown) for transmission. The reading of packets is done in response to the disposition commands present in the disposition FIFO buffer 18. The FIFO read control logic 22 is also responsible for implementing the other types of disposition commands (i.e., discard and hold). The FIFO read control logic 22 ensures that one disposition command is read out of the disposition FIFO buffer 18 for every packet that is read out of (or discarded from) the transmit FIFO buffer 20.

An embedded CPU 16 couples to communication logic 14, to header extract logic 12, to transmit FIFO buffer 20, to disposition FIFO buffer 18, and to FIFO read control logic 22. CPU 16 runs the decision making firmware which controls The operation of the entire datapath. The embedded CPU 16 has access to the communication logic 14 for receiving signals from the packet data source indicating when packets are available for transmit, the header extraction logic 12 for obtaining the header extracted from the packet, the disposition FIFO buffer 18 for writing packet disposition commands corresponding to packets in the transmit FIFO buffer 20, the transmit FIFO buffer 20 itself for reading out packet data, if required, and to the read control logic 22 for receiving indications when packets in the transmit FIFO buffer 20 have been dealt with.

Figure 2:
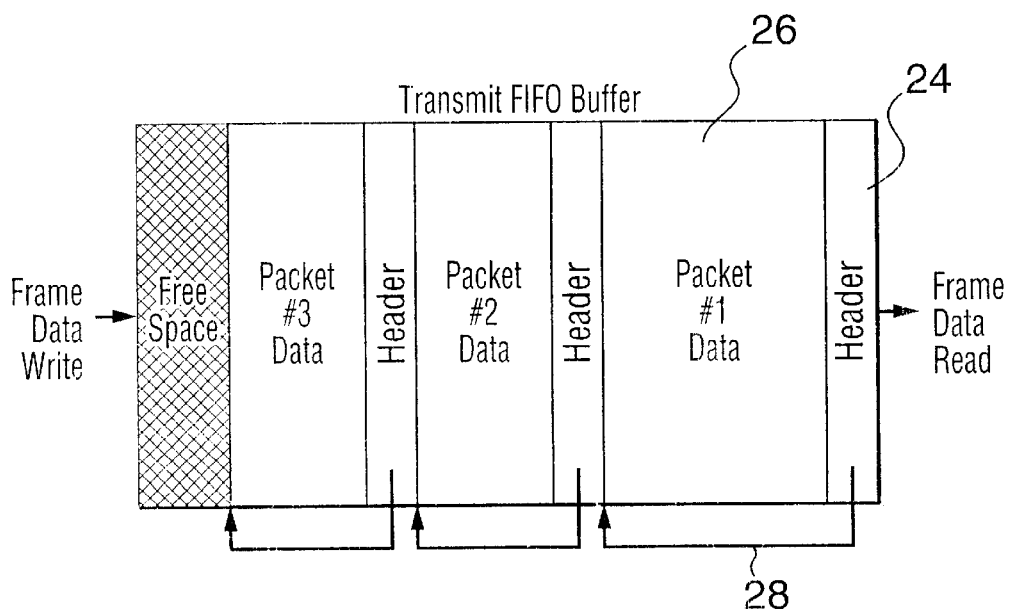
FIG. 2 is a schematic diagram of the organization of data packets in the transmit FIFO buffer.

In order to facilitate the rapid reading of complete frames from the transmit FIFO buffer 20, a linked-list scheme is used. In this scheme, a 1-word header is prepended to the raw packet data written into the transmit FIFO buffer 20 for each packet. This header simply points to the first location in the transmit FIFO buffer 20 after the end of the packet, as shown in FIG. 2. The linked-list scheme permits the FIFO read control logic 22 to quickly and simply determine the location of the next packet in the transmit FIFO buffer 20, by reading the header of the current packet. This allows the FIFO read control logic 22 to detect when the end of the current packet has been reached, and also to rapidly discard packets. To obviate the necessity to know the actual length of the packet data beforehand, the header of each packet is updated with the required pointer only after the entire packet has been written to the transmit FIFO buffer 20.

Figure 3:
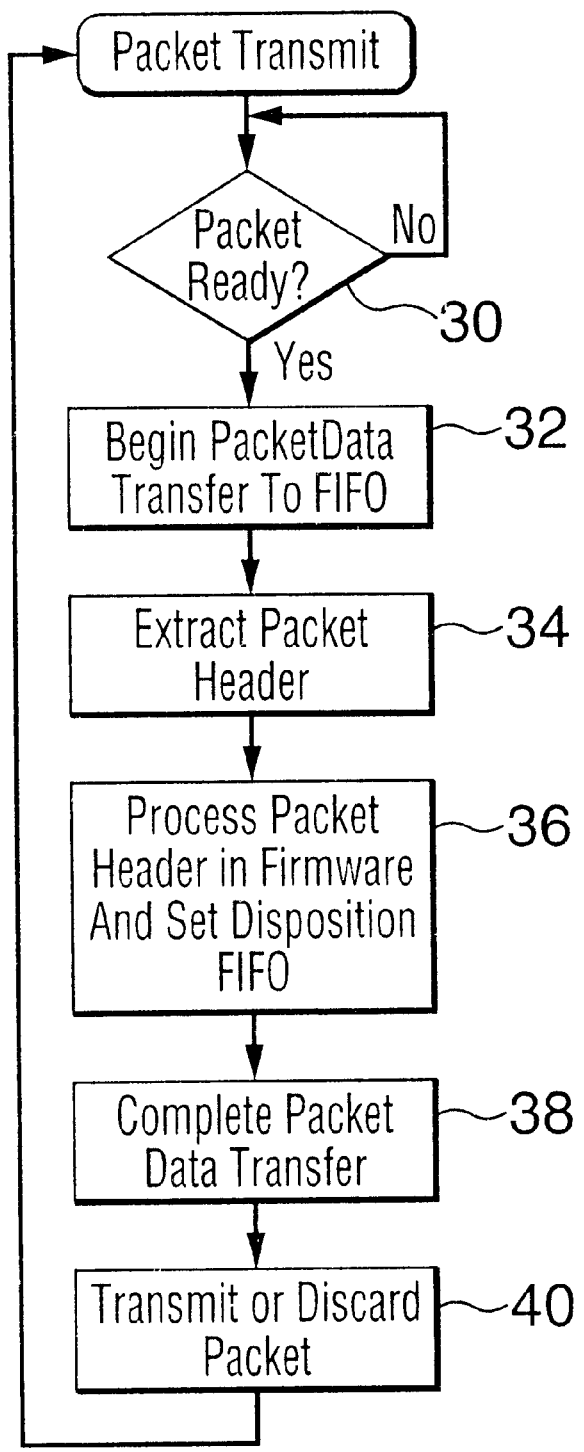
FIG. 3 is a flow diagram of the data packet transmission process.

The general packet transmission flow is shown in FIG. 3. FIG. 3 shows the overall processing flow. Firstly, the communication logic 14 asks the source whether a packet is ready for transmission at step 30. If yes, the packet interface 10 and the communication logic 14 accept signals from the source of the packet data indicating that a packet is ready for transmission, and passes these indications to the firmware in the CPU 16. When a packet is available to be transmitted, the firmware initiates the transfer of packet data at step 32 to the transmit FIFO buffer 20. The packet data are then read from the source of the packets and transferred into the transmit FIFO buffer 20. At the same time at step 34 the header extraction logic 12 strips off the packet header information and at step 36 presents this to the CPU 16, placing the remainder of the packet information into the transmit FIFO buffer 20. The firmware in the CPU 16 processes the information obtained from the packet header to make a determination as to the eventual disposition of the packet (once the packet transfer is complete); this decision, encoded as a disposition command, is written to the disposition FIFO buffer 18. After the packet data transfer at step 38 is complete and the entire packet has been written to the transmit FIFO buffer 20, the FIFO read control logic 22 uses the disposition command in the disposition FIFO buffer 18 in conjunction with the packet data in the transmit FIFO buffer 20 to complete the processing of the packet. If the disposition command indicates that the packet should be discarded, at step 40 it is simply removed from the transmit FIFO buffer 20; otherwise, if the disposition command indicates that the packet should be transmitted, the packet data are read out word-by-word and passed to the downstream MAC logic block for placement on the medium. The packet data for a transmitted packet are only removed from the transmit FIFO buffer 20 after the packet has been completely and successfully transmitted.

It is possible for packet transmission to be aborted, due to some exceptional situation such as a collision, before it is completed. It will then be necessary to make a determination as to whether the packet should be retransmitted or discarded, and then either begin the packet transmission afresh or remove the packet from the transmit FIFO buffer 20. This is accomplished by providing a signal from the FIFO read control logic 22 to the firmware running on the CPU 16 that indicates when a packet transmission has been either completed or aborted due to any cause. Additional signals are provided to enable the firmware to determine the cause of the abort, if one occurs. The firmware must then perform the processing required to determine if the packet should be retransmitted or discarded, as mandated by the appropriate protocol specification and initiate the packet retransmission or discarding by means of commands to the FIFO read control logic 22. As packet aborts are relatively infrequent events, the extra overhead represented by the additional firmware processing is not a barrier to performance.

A final provision is made to enable the firmware to gain direct access to the packet data (not merely the header prepended to the packet by the source of the data) if special processing functions are to be implemented. This is done using a special command (in place of the normal transmit and discard commands) that is written to the disposition FIFO buffer 18 for the given packet: the special command indicates to the FIFO read control logic 22 that the packet data must be held in the transmit FIFO buffer 20 and a notification must be provided to the firmware. Upon receipt of this notification, the firmware may make use of its direct access to the transmit FIFO buffer 20 to read out any or all portions of the packet data. Once the firmware has finished dealing with the packet data, it signals the FIFO read control logic 22 to either discard or transmit the frame, as usual.

A significant advantage is gained from the use of a FIFO buffer for the disposition commands (in addition to the normal FIFO buffer for packets). The disposition FIFO buffer 20 effectively decouples the firmware processing in the CPU 16, and the latencies incurred therein, from the packet transfer process that actually moves data into and out of the transmit datapath. This implies the following: firstly, packet data transfer can proceed in parallel with the decision making required to determine how the packet should ultimately be disposed of (thereby improving performance), and, secondly, that the datapath logic can proceed to continuously copy more packets from the source into the transmit FIFO buffer 20 even while the firmware is busy making the disposition decision for the first packet (thus insulating the packet throughput from the variable latencies resulting from firmware decision making).

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A datapath packet transmission controller, comprising:
   (a) a packet interface coupled to a source of data packets;
   (b) a header extraction logic circuit coupled to an output of said packet interface operative to strip off header information from each packet and transfer this information to said CPU;
   (c) a transmit FIFO buff er coupled to said header extraction circuit operative to receive packet data and act as a temporary storage for same;
   (d) a FIFO read control coupled to said transmit FIFO buffer operative to control the reading of packet data from said transmit FIFO buffer;
   (e) a disposition FIFO buffer coupled to said FIFO read control operative to receive and hold packet disposition commands corresponding to packets in said transmit FIFO buffer and to transmit each command to said FIFO read buffer upon completion of writing of a corresponding packet into said transmit FIFO buffer;
   (f) a central processing unit (CPU) coupled to said packet interface, said header extraction logic, said transmit FIFO buffer, said FIFO read control and said disposition FIFO buffer and containing firmware operative to control data packet reception, processing, and disposition;
   wherein said CPU accesses data in data packets in said transmit FIFO buffer, provides disposition commands to said disposition FIFO buffer and receives packet transmit completion notification from said FIFO read control.

2. A controller according to claim 1, including a communications logic circuit operative to receive signals from a source of data packets indicating when a packet is ready for transmission and wherein said CPU is coupled to said packet interface through said communications logic circuit.

3. A controller according to claim 1, wherein said CPU has firmware which performs data packet classification and disposition tasks on each data packet that is received by said transmit FIFO buffer which runs concurrently with and independently of the transfer of frame data from the source.

4. A controller according to claim 3, wherein frame classification is performed on a header prepended to the packet data written into the transmit FIFO buffer for each data packet. by the header extraction logic circuit on the basis of data supplied by the source.

5. A controller according to claim 1, wherein said disposition FIFO buffer holds information pertaining to the disposal of data packets that are buffered in said transmit FIFO buffer, with a one-to-one correspondence between entries in said disposition FIFO buffer and the data packets in said transmit FIFO buffer.

6. A datapath packet transmission controller, comprising:
   a) a packet interface coupled to a source of data packets;
   b) a header extraction unit coupled to an output of said packet interface, operative to separate said data packets received from said packet interface into header information portions and payload information portions;
   c) a transmit FIFO buffer unit coupled to said header extraction unit, operative to receive and store said payload information portions;
   d) a central processing unit (CPU) coupled to said header extraction unit, operative to receive and process said header information portions;
   e) firmware means executed by said CPU, operative to process said header information portions and generate disposition commands specifying the disposition of said payload information portions; and
   f) a disposition FIFO buffer unit coupled to said CPU, operative to hold said disposition commands;
   wherein the number of said disposition commands in said disposition FIFO buffer unit is equal to the number of said payload information portions in said transmit FIFO buffer unit and each said disposition command bears a one-to-one correspondence with one of said payload information portions in said transmit FIFO buffer unit.

7. The apparatus of claim 6, wherein said firmware means performs data packet clarification and disposition tasks on each of said data packets received from said packet interface, and wherein said firmware means runs concurrently with, and independently of, the transfer of said payload information portions into said transmit FIFO buffer unit.

8. The apparatus of claim 6, further including a communication logic circuit coupled to said packet interface and to said CPU, wherein said communication logic circuit is operative to receive signals from said packet interface indicating data packets are available to be transmitted, and to pass said signals to said CPU for processing.

9. The apparatus of claim 6, wherein said CPU is coupled to said transmit FIFO buffer unit, and is operative to read out at least a portion of said payload information portions in said transmit FIFO buffer unit.

10. The apparatus of claim 6, further including a FIFO read control unit coupled to said transmit FIFO buffer unit and said disposition FIFO buffer unit, wherein:
   said transmit FIFO buffer unit is operative to signal said FIFO read control unit when said transmit FIFO buffer unit contains at least a complete one of said payload information portions;
   said disposition FIFO buffer unit operative to signal said FIFO read control unit when said disposition FIFO buffer unit contains at least one of said disposition commands;
   said FIFO read control unit is operative to read out a first one of said disposition commands from said disposition FIFO buffer unit and to read out a first one of said payload information portions from said transmit FIFO buffer unit, when said disposition FIFO buffer unit contains at least one of said disposition commands;
   said FIFO read control unit processes said first one of said disposition commands, wherein processing said disposition commands includes transmitting a corresponding one of said payload information portions when a corresponding one of said disposition commands is a transmit command and discarding a corresponding one of said payload information portions when a corresponding one of said disposition commands is a discard command; and
   said FIFO read control unit continues reading and processing further ones of said disposition commands until said disposition FIFO buffer unit contains none of said disposition commands, or said transmit FIFO buffer unit contains no complete ones of said payload information portions.

11. The apparatus of claim 10, wherein said CPU is coupled to said FIFO read control unit, and said CPU is operative to accept and process packet transmission status information received from said FIFO read control unit.

12. The apparatus of claim 10, further including local memory means coupled to said FIFO read control unit, and said FIFO read control unit is operative to copy said payload information portions from said transmit FIFO buffer unit to said local memory means.

13. A method of selectively discarding a data packet using the apparatus of claim 10, comprising the steps of:
 a) said CPU processing one of said header information portions and determining that a corresponding one of said payload information portions will be discarded and not transmitted;
 b) said CPU writing one of said disposition commands into said disposition FIFO buffer unit indicating that said corresponding one of said payload information portions must be discarded; and
 c) said FIFO read control unit reading said one of said disposition commands, and reading out and discarding said corresponding one of said payload information portions from said transmit FIFO buffer unit in accordance with said one of said disposition commands.

14. A method of re-transmitting failed transmission packets using the apparatus of claim 11, comprising the steps of:
 a) said FIFO read control unit reading a first one of said payload information portions from said transmit FIFO buffer unit, and attempting to transmit said first payload information portion;
 b) said FIFO read control unit notifying said CPU with packet transmission status after said transmission attempt is complete, indicating whether said transmission attempt was successful or failed;
 c) said CPU processing said packet transmission status and determining whether transmission of said first one of said payload information portions must be re-attempted; and
 d) said CPU notifying said FIFO read control unit, upon failure of said transmission attempt, to reattempt transmission of said first one of said payload information portions or discard said first one of said payload information portions.

15. A method of selectively copying packets to said local memory means using the apparatus of claim 12, comprising the steps of:
 a) said CPU processing one of said header information portions for one of said data packets, and determining that a corresponding one of said payload information portions must be copied to said local memory means;
 b) said CPU writing one of said disposition commands into said disposition FIFO buffer unit, indicating said corresponding one of said payload information portions must be copied to said local memory means; and
 c) said FIFO read control unit reading said one of said disposition commands from said disposition FIFO buffer unit and copying said corresponding one of said payload information portions from said transmit FIFO buffer unit to said local memory means in accordance with said one of said disposition commands.

* * * * *

UNITED STATES PATENT AND TRADEMARK OFFICE
CERTIFICATE OF CORRECTION

PATENT NO. : 6,163,539
DATED : December 19, 2000
INVENTOR(S) : Thomas Alexander et al.

It is certified that error appears in the above-identified patent and that said Letters Patent is hereby corrected as shown below:

Column 1,
Line 27, replace "too" with -- 100 --;
Line 31, replace "ever" with -- every --;

Column 2,
Line 43, replace "The" with -- the --;
Line 44, replace "The" with -- the --;
Line 52, replace "hardwareonly" with -- hardware only --;
Line 53, replace ">" with -- ) --;

Column 3,
Line 60, replace "." with -- , --;
Line 67, (last ¶, last line), after the word "buffer" replace "," with -- . --;

Column 4,
Line 21, before "FIG. 1" delete "the";

Column 5,
Line 12, after "controls" replace "The" with -- the --;

Column 6,
Line 66, replace "throughput" with -- throughout --;

Column 7,
Line 17, replace "buff er" with -- buffer --; and
Line 55, after "packet" delete ".".

Signed and Sealed this

Fifteenth Day of February, 2005

JON W. DUDAS
*Director of the United States Patent and Trademark Office*